United States Patent [19]

Tung-lung et al.

[11] 4,137,715
[45] Feb. 6, 1979

[54] FOG SMOKE-FILTRATING AND MUFFLING DEVICE UTILIZED BY VEHICLE

[76] Inventors: Ho Tung-lung, No. 14, Alley 46, Sung Chiang Rd., Taipei; Lin Ping-ho, 1st Fl., No. 110-5, Sec. 2, San Min Rd., Pan Chiao, Taipei Hsien, both of Taiwan

[21] Appl. No.: 709,896

[22] Filed: Jul. 29, 1976

[51] Int. Cl.² ............ F01N 3/04; F01N 7/12; B01D 47/00
[52] U.S. Cl. ............... 60/310; 55/DIG. 30; 55/84
[58] Field of Search ........... 55/DIG. 30, 255–256, 55/309, 84, 17, 277, 227; 60/310, 319

[56] References Cited

U.S. PATENT DOCUMENTS

| | | | |
|---|---|---|---|
| 3,326,198 | 6/1967 | Jackson et al. | 55/309 X |
| 3,642,259 | 2/1972 | Bowden | 55/DIG. 30 X |
| 3,853,484 | 12/1974 | Sudan et al. | 55/DIG. 30 X |
| 3,967,941 | 7/1976 | Terao | 55/DIG. 30 |

*Primary Examiner*—Charles N. Hart
*Assistant Examiner*—E. Rollins Cross
*Attorney, Agent, or Firm*—Shoemaker and Mattare, Ltd.

[57] ABSTRACT

A fog smoke-filtrating and muffling device utilized by vehicle is an apparatus utilizing an intake pipe to lead the waste gas of engine to blow the water, which is contained in a tank, to disperse to become a fog. The carbides and impurities in the waste gas can be dissolved in the water. Then, in a evaporation chamber and a releasing chamber, the water droplets and waste gas can be separated from each other, and the purified waste gas is exhausted. The water droplets can be collected and filtrated through a reservoir. The water in the reservoir can be used again. Meanwhile, the water in the tank of this invention can absorb the noise and the shock of engine. The cyclic flow of water in this invention can cool the engine as well.

3 Claims, 3 Drawing Figures

FOG SMOKE-FILTRATING AND MUFFLING DEVICE UTILIZED BY VEHICLE

BRIEF SUMMARY OF THE INVENTION

This device is designed to installed on the vehicle for filtrating the waste gas and muffling the noises of engine.

Today, the waste gas and noise of vehicle are the most serious air pollution problem. Some vehicles have already been installed with filtrating devices and mufflers separately, but the filtrating effect is sooner or later reduced because that the devices are blocked by the impurities of the waste gas. Besides, the filtrating effect in the conventional devices can not be attained fully when the load of engine is increased in the vehicle starting, speeding up, or climbing the mountains. The blocked filtrating devices lose not only their functions in purifying the waste gase, they also add more load to the engines and may cause the engine being damaged.

This invention utilizes the fluid as the filtrating medium to dissolve various carbides and impurities in the waste gas. Therefore the waste gas can be purified. Also, the fluid in this invention absorbs the noise and shock of engine; the conventional mufflers utilized by vehicle can be replaced by this apparatus. The cyclic flow of the fluid in this invention has a cooling effect to engine.

DETAILED DESCRIPTION

Figure 1:
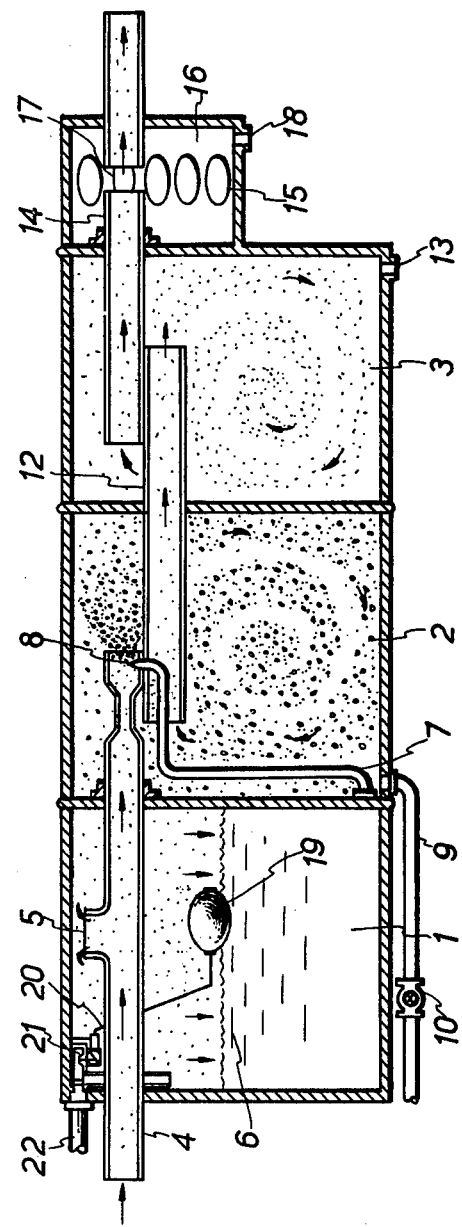
FIG. 1 is a schematic illustration depicting the structural parts of this invention.
Figure 3:
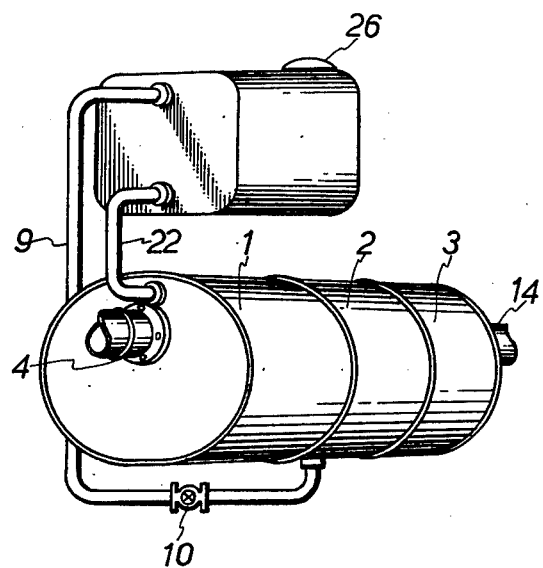
FIG. 3 shows the appearance of this invention.
Figure 2:
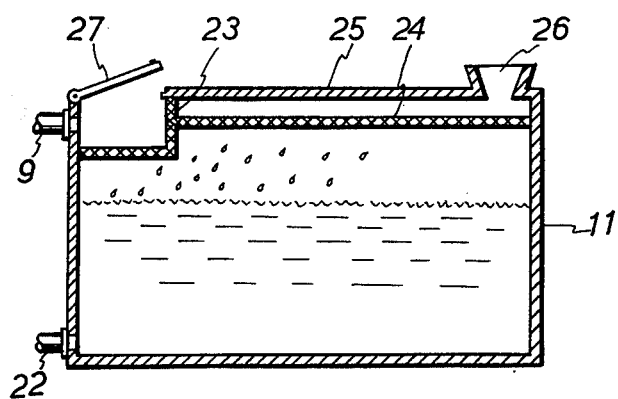
FIG. 2 is a schematic illustration depicting the structure of the reservoir of this invention.

From the drawings, the device can be seen consisting of three major parts, a water tank 1, the mixture chamber 2, and the evaporation chamber 3. The intake pipe 4 connects with the exhaust pipe of engine.Entering into the intake pipe 4, the waste gas of engine is divided into two courses. First, the waste gas, which comes from the engine with rather high pressure, goes through the opening 5 to press the water 6 contained in the water tank 1. Through the pipe 7, the water which is pressed by the waste gas, flows into the exit part of intake pipe 4 again. The exit part of intake pipe 4 extends into the mixture chamber 2. The noozle 8 of pipe 7 functions as a Venturi. Second, the waste gas of engine goes directly to the narrow neck exit part of intake pipe 4 to blow the water droplets coming from the nozzle 8 to diperse into fog. The narrow neck exit part of intake pipe 4 has two functions: first, it enables the waste gas having faster speed to get through the exit, so that the water droplets in the nozzle 8 can be blown out uniformly; second, it adds the pressure of waste gas in going through the opening 5 to press the water 6 to enter the pipe 7. The mixture of waste gas coming from the intake pipe 4 and the water droplets coming from the nozzle 8 from an eddy current in the maxture chamber 2. Then a large amount of the carbonic elements and other impurities are dissolved in the water. Finally, the small water droplets in the eddy current adhere to the inner wall of mixture chamber 2, and then fall down to the bottom, and flow out from the pipe 9. The pipe 9, which is installed at the bottom of mixture chamber 2, has a regulating valve 10 for the purpose to regulate the flowing of water from the mixture chamber 2 into the reservoir 11.

The connecting pipe 12 leads the eddy current, which is composed by the waste gas and small water droplets, from mixture chamber 2, into the evaporation chamber 3. Entering into the evaporation chamber 3, the waste gas together with the small water droplets becomes an eddy current again. The lower pressure in the evaporation chamber 3 in comparison with that in the mixture chamber 2 enables the small water droplets and some impurities, which are more weighty than the gas, being separated from waste gas and being drained out from outlet 13.

From the evaporation chamber 3, the exhaust pipe 14 discharges the waste gas into the atmosphere. Many holes 15 are opened on the wall of releasing room 16. Inside the releasing room 16, the exhaust pipe 14 has a clearance 17. Owing to the atmosphere entering the holes 15 into the releasing room 16, the pressure of waste gas in the exhause pipe 14 is decreased down rapidly during it passing through the clearance 17. Then, more water droplets and impurities fall down at the releasing room 16, and the light waste gas is drained out continuously in the exhaust pipe 14. So, the releasing room 16 can purify the waste gas once again. At the bottom of releasing room 16, a hole 18 is opened for draining out the water droplets and the impurities.

In the water tank 1, there are a float bowl 19, a float arm 20, and a float operated valve 21. When the water level in the water tank 1 falls down into the bottom the float arm 20 opens automatically the float operated valve 21 to permit the water in the reservoir 11 flowing through the pipe 22 into the water tank 1. The float operated valve 21 is closed as soon as the water tank 1 is full. The pipe 9 and pipe 22 are utilized for connecting the reservoir 11 with the mixture chamber 2 and water tank 1 respectively. Through the pipe 9, the dirty water together with some impurities in the mixture chamber 2 enters into the reservoir 11. Two filter beds 23 and 24 are utilized in reservoir for filtrating the waste gas and water in the reservoir 11. Then, the water is collected at reservoir 11 and the waste gas is exhausted out from the holes 25 and the funnel 26. From the funnel 26, the clean water can be replenishec into the reservoir 11. The cover 27 at the top of reservoir 11 can be opened for the purpose to clean or replace the dirty filter beds 23 and 24.

This invention utilizes the exhaust pressure of engine to lead the waste gas into a water tank 1 and a mixture chamber 2 for the purpose to dissolve the carbides and other impurities in the water and to generate a eddy current for mixing fully the waste gas with the water droplets.

Through the aforesaid processing, the shock of vehicle can be absorbed by the water contained in this invention. Therefore the noise can be eliminated. The conventional muffler is not needed at all. Furthermore, there are two features provided by this invention to the conventional vehicle. First, the filtrating function of this invention to the waste gas is added up with the fogging effect, which is the result of waste gas pressure of vehicle engine; therefore when the engine load is increased during the vehicle being started or speeded up or climbing mountains, the volume of exhausted dirty waste is not increased. Second, the cyclic flow of water in this invention has a cooling effect to the vehicle. This cooling effect can increase the engine efficiency and prolong the vehicle life as well.

We claim:

1. A fog smoke-filtrating and muffling device utilized by vehicle which comprises:

an intake pipe (4) in connection with the engine of vehicle for leading the waste gas into a water tank (22), in which said intake pipe has an opening for permitting part of the waste gas from the engine entering into said water tank to press the water into a pipe which is connected to a mixture chamber (2); said water tank containing the water so that the noise and shock of the engine can be absorbed by the water; said intake pipe extending into said mixture chamber has a contracted exit, by which the waste gas can be accelerated to blow the water droplets which came from the nozzle of said pipe to disperse to become fogs and increasing the pressure of waste gas in passing through said opening of said intake pipe; a connecting pipe (12) for connection between the said mixture chamber and an evaporation chamber (3) which has an outlet opened at bottom; the said outlet providing the mixture of the waste gas and small water droplets coming from said mixture chamber to evaporate or to adhere to the surface of the wall of said evaporation chamber (3) and falling down to the bottom and then being drained out from said outlet; and exhaust pipe connecting said evaporation chamber for exhausting out the mixture of waste gas and water droplets; a releasing room (16) which has many holes to let the atmosphere enter into it; in said releasing room, said exhaust pipe has a clearance (17) on it to let the pressure of the waste gas reduce rapidly and separate the water droplets from waste gas, and to let the water droplets and other impurities in this releasing room drain out from the holes at the bottom of said releasing room; a pipe connecting said mixture chamber and reservoir for flowing the water droplets in said mixture chamber into said reservoir; another pipe (22) connecting said reservoir with said water tank for flowing back the water in said reservoir into said water tank.

2. A fog smoke-filtrating and muffling device utilized by vehicle as defined in claim 1 in which the said water tank including a float bowl, a float arm, and a float operated valve for opening the pipe, which connects the said reservoir and the said water tank, as the water in said water tank is being emptied, and closes the pipe as the water tank is being filled.

3. A fog smoke-filtrating and muffling device utilized by vehicle as defined in claim 1 in which the said reservoir has a cover and a funnel and many holes at its top; beneath that top, two filter beds being installed for filtrating the water and waste gas which come from a pipe in connection with said mixture chamber; said cover can be opened for the purpose to replace or clean the dirty filter beds; said funnel is used to replenish clean water into said reservoir.

* * * * *